F. A. HART.
COMBINED TYPEWRITING AND COMPUTING MACHINE.
APPLICATION FILED DEC. 12, 1911.
1,388,257. Patented Aug. 23, 1921.
6 SHEETS—SHEET 1.
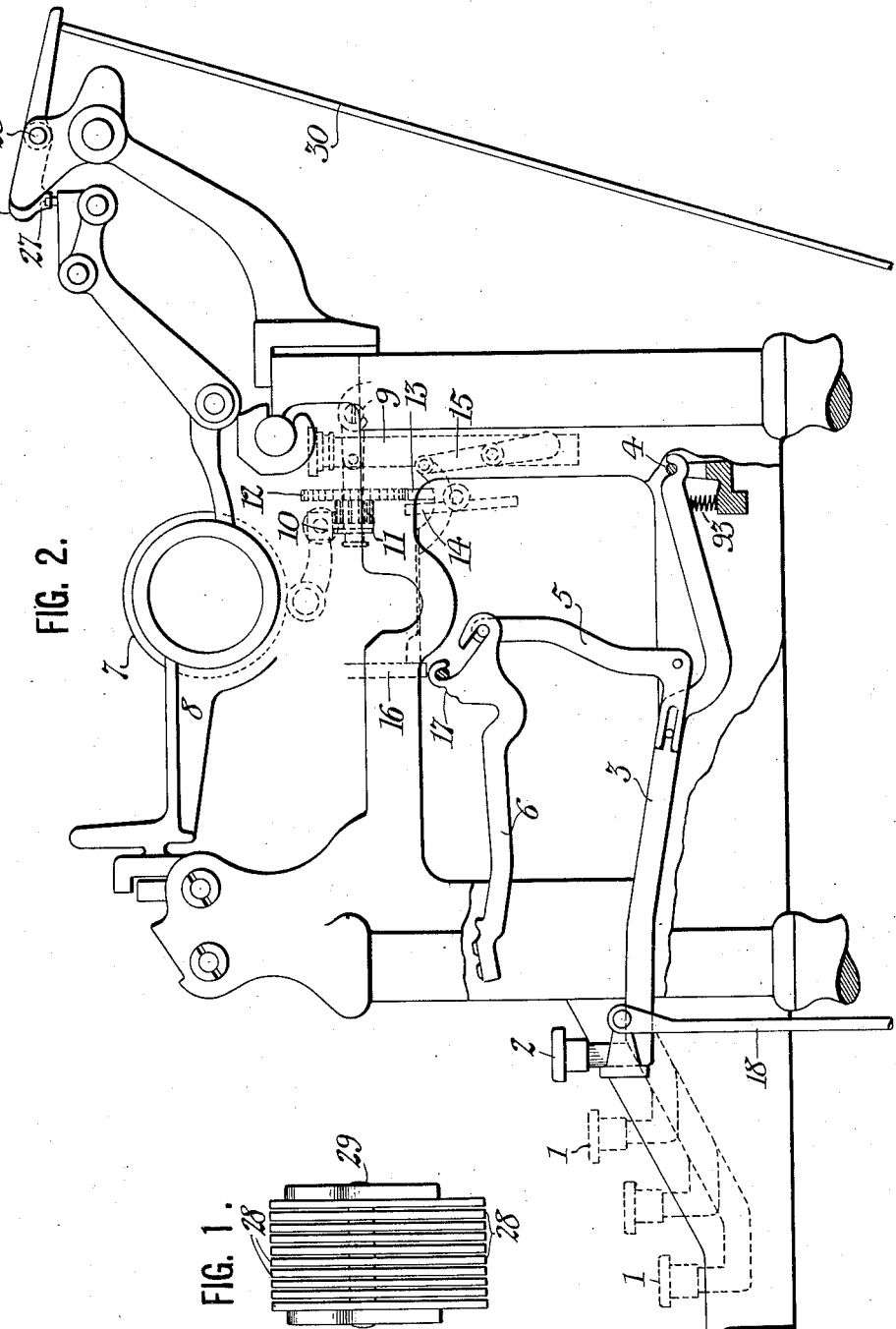

F. A. HART.
COMBINED TYPEWRITING AND COMPUTING MACHINE.
APPLICATION FILED DEC. 12, 1911.
1,388,257. Patented Aug. 23, 1921.
6 SHEETS—SHEET 2.
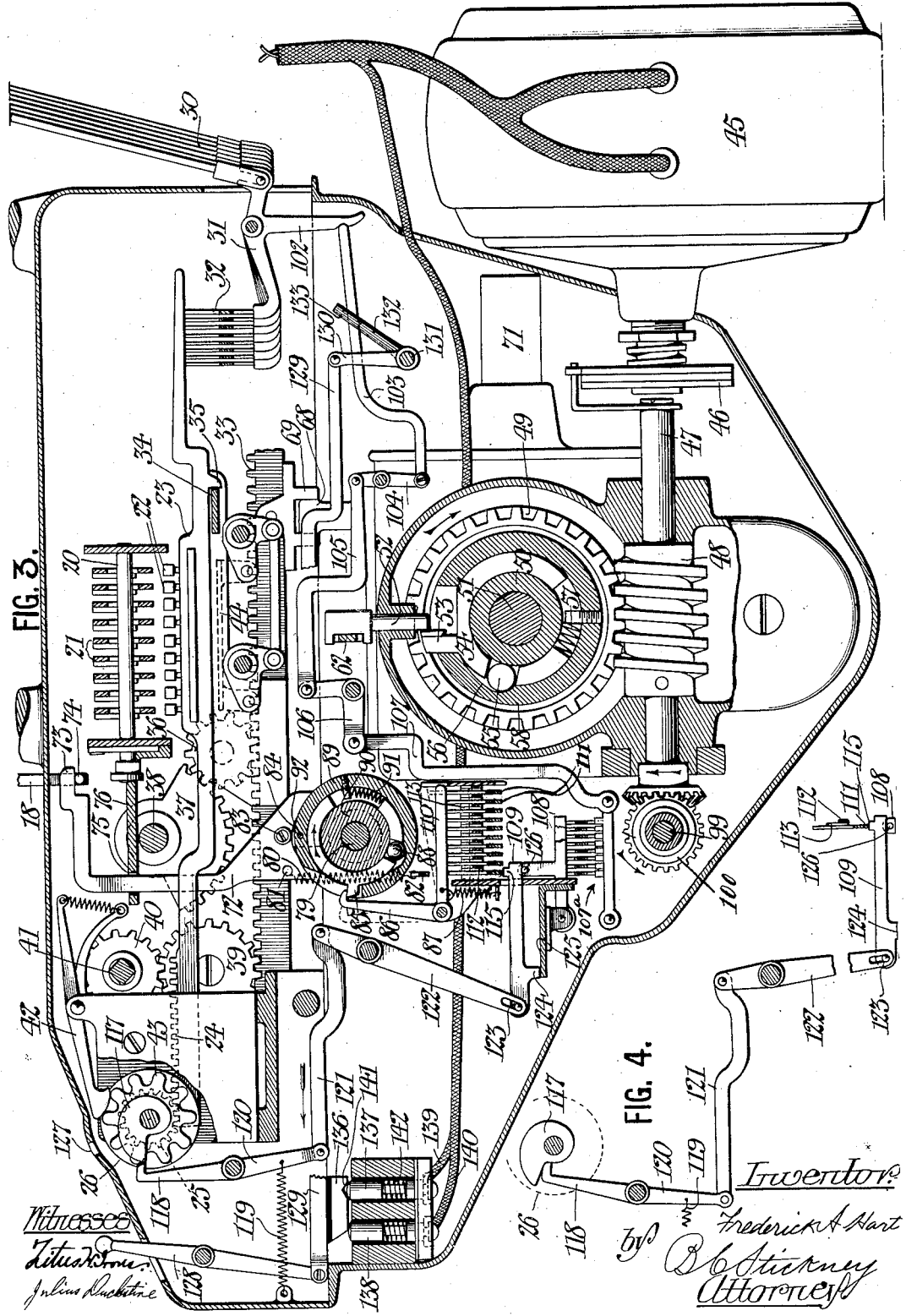

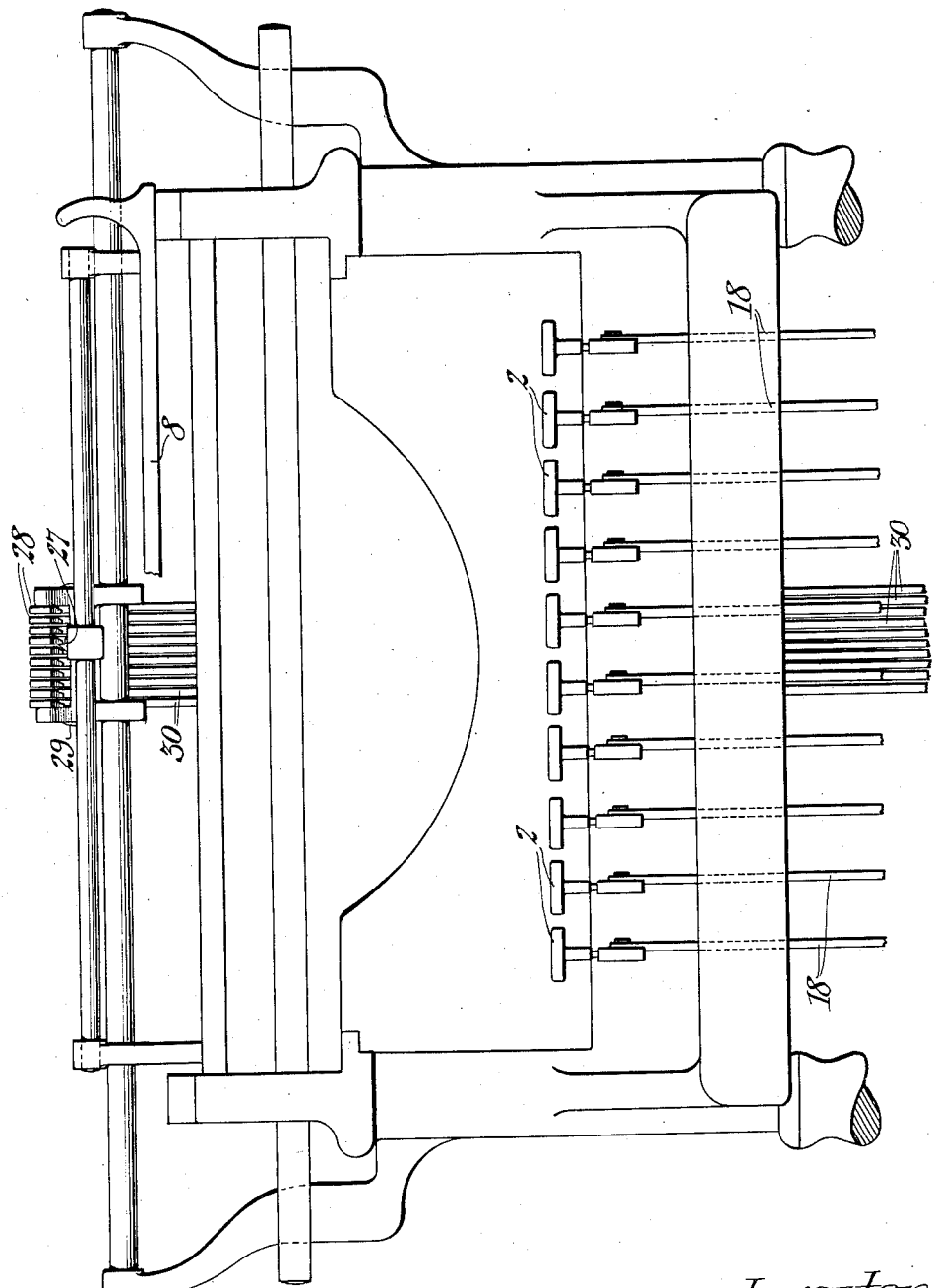

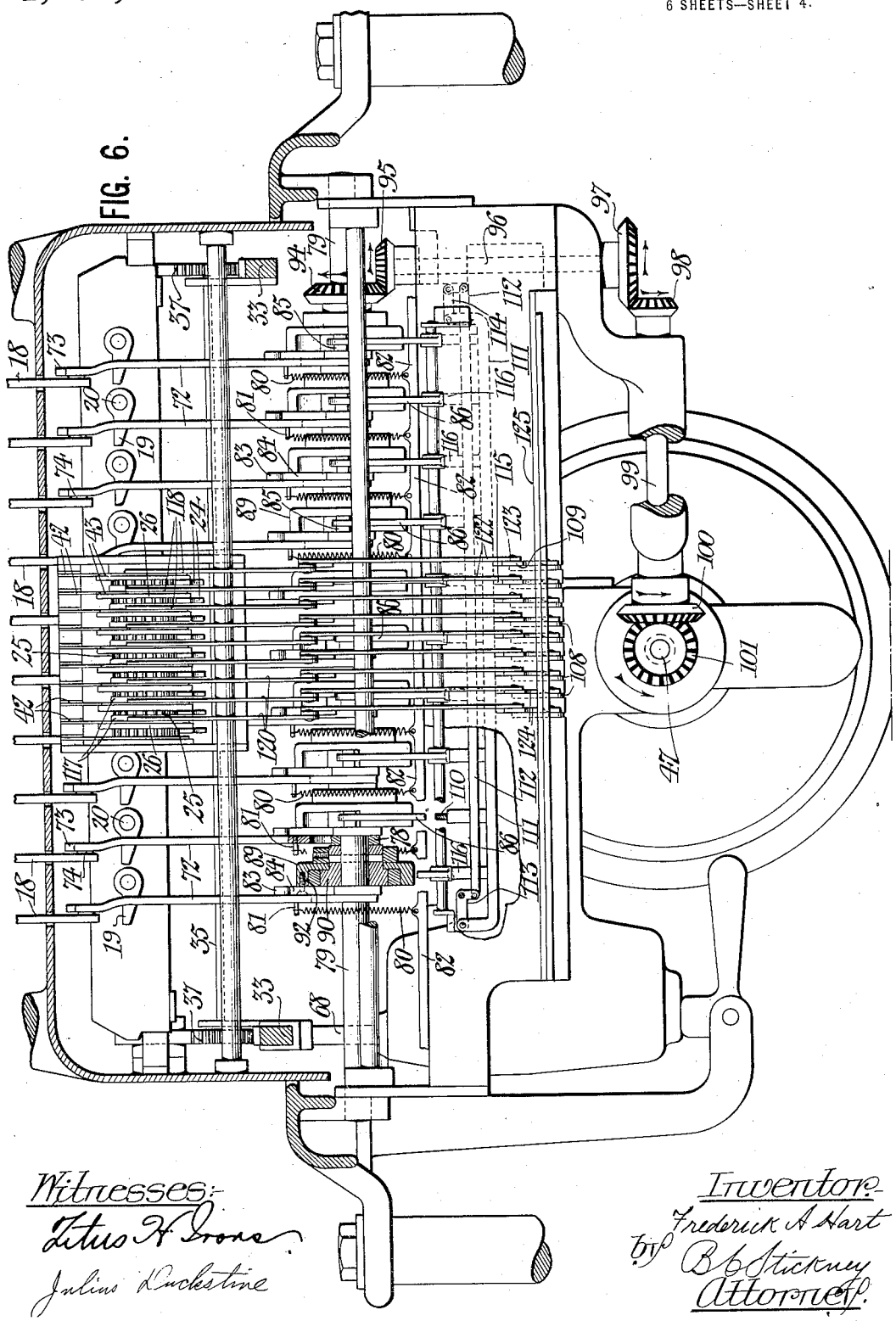

F. A. HART.
COMBINED TYPEWRITING AND COMPUTING MACHINE.
APPLICATION FILED DEC. 12, 1911.
1,388,257.
Patented Aug. 23, 1921.
6 SHEETS—SHEET 5.
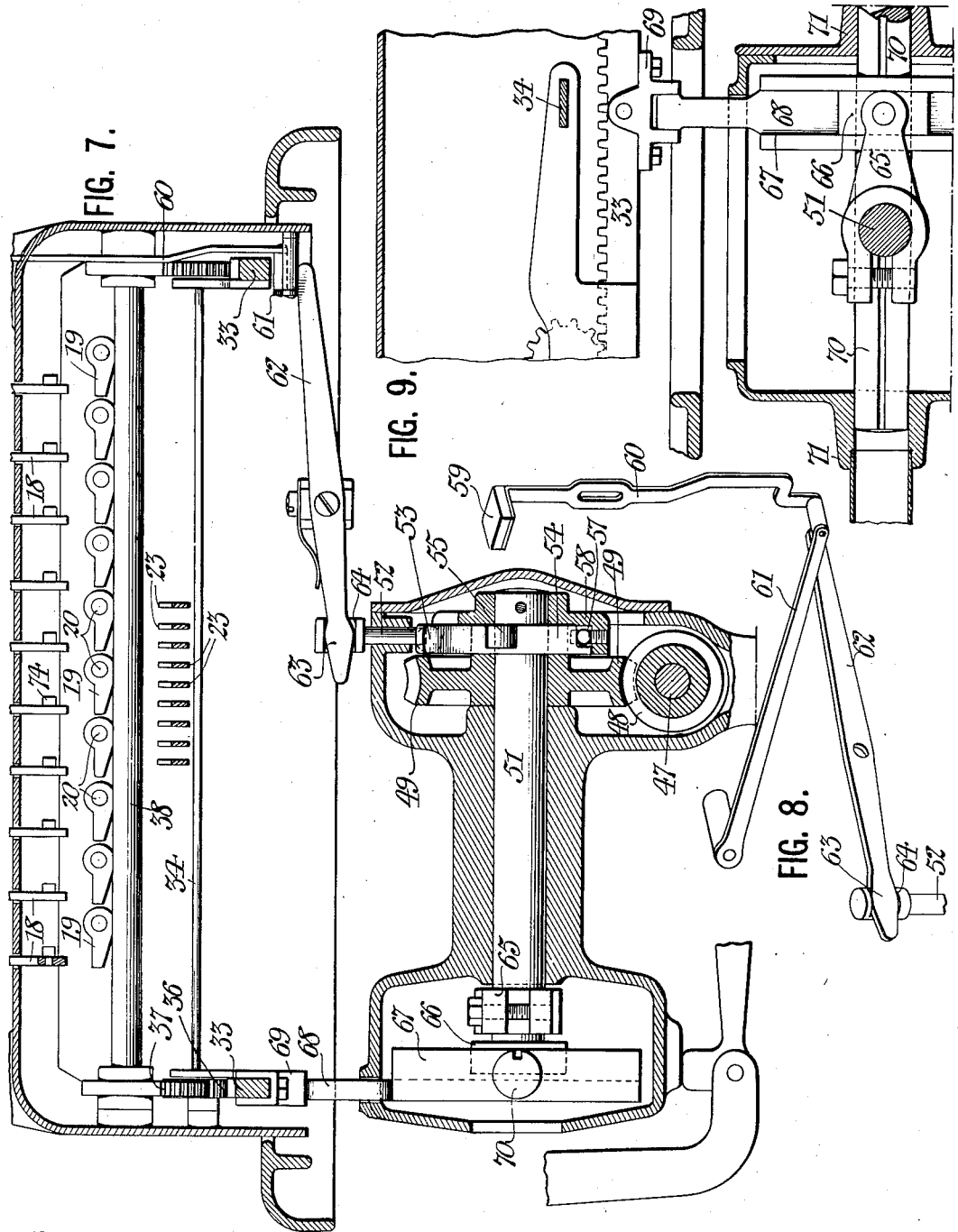

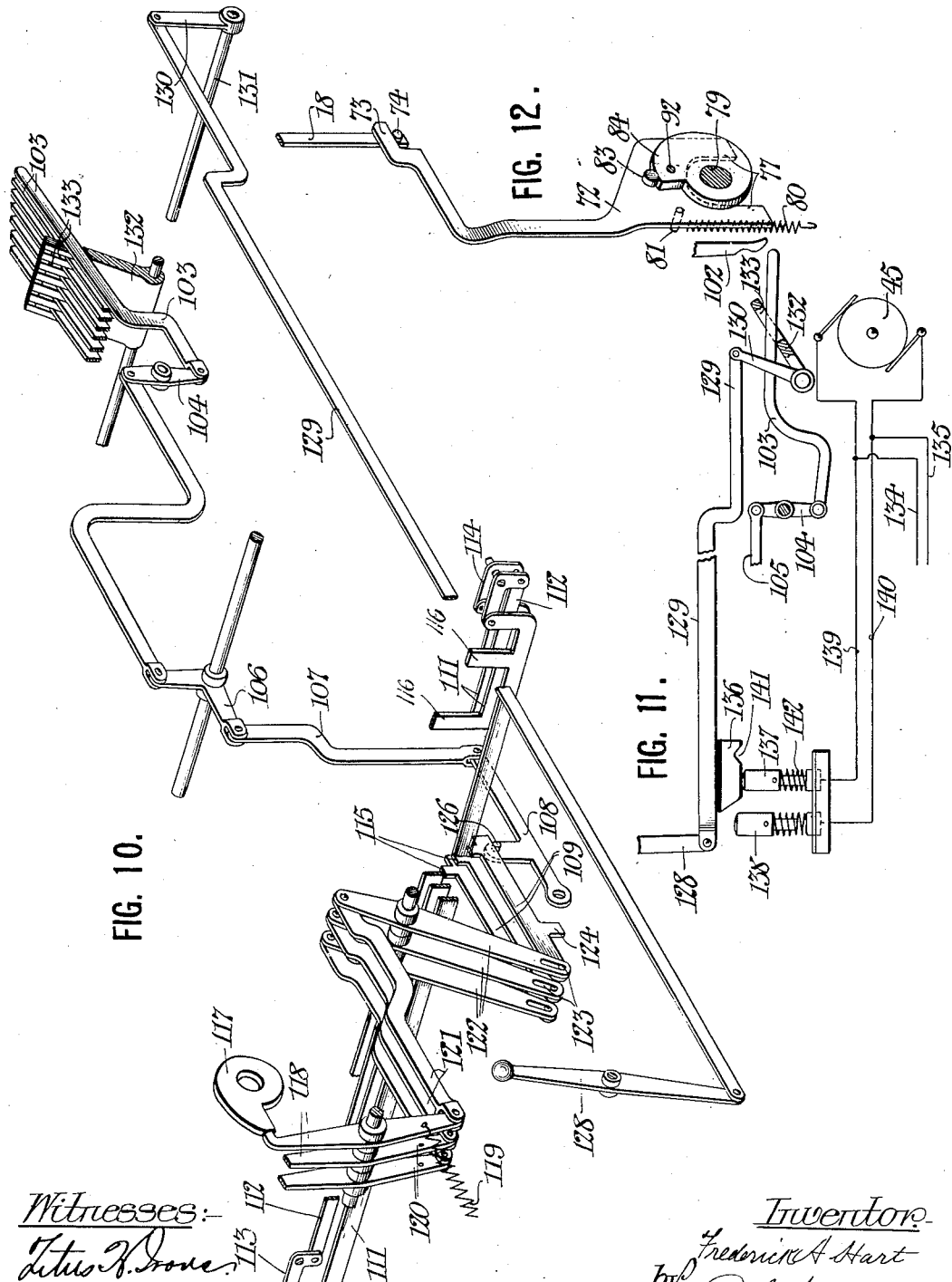

UNITED STATES PATENT OFFICE.

FREDERICK A. HART, OF JERSEY CITY, NEW JERSEY, ASSIGNOR, BY MESNE ASSIGNMENTS, TO UNDERWOOD COMPUTING MACHINE COMPANY, OF NEW YORK, N. Y., A CORPORATION OF NEW YORK.

COMBINED TYPEWRITING AND COMPUTING MACHINE.

1,388,257.  Specification of Letters Patent.  Patented Aug. 23, 1921.

Application filed December 12, 1911. Serial No. 665,315.

*To all whom it may concern:*

Be it known that I, FREDERICK A. HART, a citizen of the United States, residing in Jersey City, in the county of Hudson and State of New Jersey, have invented certain new and useful Improvements in Combined Typewriting and Computing Machines, of which the following is a specification.

This invention relates to combined typewriting and computing machines, and is illustrated in connection with a machine of the Underwood-Hanson type.

In these machines, it is customary for the operator to copy upon the work sheet the result of a computation which appears upon the computing wheels. It is possible, however, for the operator to make an error in transcription, thus leaving it always uncertain whether the result written at the foot of a column is absolutely correct or not.

One of the principal objects of the present invention is to avoid this difficulty, and to insure that the same result shall be written as shown on the dial wheels or devices.

To accomplish this result, I provide a power-driven device, preferably connectible to an electric motor, which mechanically operates the types to print on the work sheet the number which appears on the dial wheels, so that the necessity is avoided of depending upon the accuracy of the operator. In the preferred form of the invention, the numeral type-bars are operable by spring-driven operators, which however do not interfere with the usual manipulation of the numeral keys of the typewriting machine. The spring-driven operators are then automatically reset by the action of the power-driven devices thereon. Suitable selecting mechanism is provided in connection with the dial wheels to determine which digits shall be written in the digit columns; and the position of the typewriter carriage controls the denomination of the dial wheel which selects the type to be printed in any digit column. In other words, the carriage determines which dial wheel shall act, and in what column the digit shall be printed, while the dial wheel determines which digit shall be used.

There are employed ten type bar operators, one for each numeral type including the "0" type; and each dial wheel has means for selecting or determining which of said ten operators shall be made effective. A snail cam is provided upon each dial wheel, and a selector is moved by said cam in one direction and returned by a spring. The construction is such that when the dial wheel is in any rotative position, the selector is in position to engage or control that type operator which corresponds to that digit upon the dial wheel which appears at the sight-opening. The selectors are hence ready to cause the operations of the types; and a dog upon the carriage operates in succession a series of devices which cause said type operators to become effective in succession. As each type operator works, the type is printed and the paper carriage is fed, thus bringing into operation the device which causes the succeeding numeral type to print, and so on.

The power-driven printing devices are preferably normally out of use, to permit the machine to be operated in the usual manner; but by pushing a lever they may be brought into use at will. Said operators may control either the usual numeral type-bars, or if desired an additional set of type-bars may be provided, each carrying a specially designed type different from the corresponding numeral type of the typewriter, so that the result of the computation will be written on the work sheet with the special type, thus showing that the result was written mechanically by the machine itself, and not by the user.

Other features and advantages will hereinafter appear.

In the accompanying drawings,

Figure 1 is a plan of a series of denomination-determining jacks moved in succession by a dog on the typewriter carriage.

Fig. 2 is a part sectional side elevation of the typewriter portion of a combined typewriting and computing machine of the Underwood-Hanson type. This figure is to be read in connection with Fig. 3.

Fig. 3 is a sectional side elevation of the computing mechanism and its connections.

Fig. 4 is a sectional side elevation to illustrate diagrammatically the connection between the dial or computing wheels and the typewriting mechanism, whereby any dial wheel may determine which numeral type is to be printed.

Fig. 5 is a front elevation of the typewriting mechanism, and is to be read in connection with Fig. 6.

Fig. 6 is a sectional front elevation of the computing mechanism and its connections, forming the lower part of the machine, the upper part of which is seen at Fig. 5.

Fig. 7 is a sectional elevation taken transversely of the machine to illustrate the numeral key stems and devices operated thereby, and certain other portions of the computing mechanism, including the general operator and the motor-driven mechanism whereby it is reciprocated.

Fig. 8 is a perspective of a key mechanism usually employed in said machine, for causing the general operator to be actuated by the electrical motor.

Fig. 9 is a sectional side elevation to illustrate the connection between the general operator and the motor-driven mechanism which reciprocates it, seen at the left hand side of Fig. 7.

Fig. 10 is a perspective front view of the principal members of the denomination determining mechanism, and also the mechanism by which each dial or computing wheel selects the number to be written upon the work sheet.

Fig. 11 is a part-sectional side elevation to illustrate the device, whereby the motor-driven type-operating mechanism may be brought into action at the will of the operator.

Fig. 12 is a perspective view illustrating the connection between a type-operating link and a motor-driven shaft, whereby the movements of the type to and from the work sheet are effected or controlled.

The typewriting mechanism comprises alphabet type keys 1 and numeral keys 2, all of which are mounted upon levers 3 fulcrumed at 4 and connected by means of bell cranks 5 to type-bars 6, to swing the latter up to print against the platen 7, which is mounted upon a carriage 8, the latter being driven by a spring barrel 9, and having a rack 10 to mesh with a pinion 11, which drives an escapement wheel 12. The escapement wheel is controlled by dogs 13, 14, operated by a frame 15 on which is fixed a universal bar 16 that is actuated by heels 17 on the type-bars in the usual manner in an Underwood typewriting machine.

The numeral keys 2, (except that key which is connected to the "0" type) also actuate a pin-setting mechanism of the computing machine. The numeral keys have pendent stems 18 to engage and depress arms 19 provided upon horizontal rock shafts 20, which extend rearwardly beneath the key levers and form part of linkages 21, which depress pins 22 to determine how far the dial wheels are to be rotated. These pins 22 extend in rows from front to back of the machine, each row carried upon a bar 23, which at its forward end has a rack 24 in mesh with a pinion 25 on the dial wheel 26; the operation being disclosed in my pending application No. 466,836, filed December 10, 1908 (now Patent No. 1,270,411, dated June 25, 1918).

There is one row of pins 22 upon each of the rack bars 23, and there is one rack bar for each denomination. Each row of pins must be lifted above the others in order to come into the paths of the linkages 21, and this lifting of the pin rows is effected by a dog 27 upon the typewriter carriage 8, which during the letter feeding movement of the latter, engages and lifts one by one the usual jacks 28, which are fulcrumed at 29, and at their rear ends depress rods 30, which are connected by levers 31 with linkages 32, whereby the pin-carrying rack bars 23 are elevated and dropped in succession as the paper carriage 8 feeds along; so that when a digit is written in any place in a column on the work sheet, the rack bar 23 of corresponding denomination is lifted, and a pin 22 thereon is depressed, according to the key struck.

After the number has been written and the corresponding pins depressed, the racks 23 having dropped again to normal positions, the general operator is reciprocated to carry the number into the dial wheels 26. This general operator comprises a pair of racks 33, one at each side of the machine and connected by cross-bar 34, which engages the depressed pins 22, to drive forwardly the racks 23 and turn the dial wheels 26; while said cross bar subsequently engages teeth 35 and carries the rack-bars 23 back to initial positions. The racks 33 are connected by idle pinions 36 to a pair of segments 37 fixed upon a rock-shaft 38 extending horizontally across the machine, and at its ends journaled in the side walls thereof. There is also connected to one of the racks 33 a tens-carrying mechanism comprising an idle pinion 39 meshing with a pinion 40, the latter suitably connected to a square shaft 41, which carries means to assist in carrying tens from one dial wheel to another, as set forth in said application.

From the foregoing, it will be seen that numbers may be written in the column on the work sheet, and concomitantly added upon the dial wheels. The latter may be held by spring detents 42 engaging gears 43 fixed on the dial wheels. Upon the return of the racks 23 and the general operator 33, a universal plate 44 is lifted beneath the pins 22, to reset to normal positions those which have been depressed.

The present practice in said Underwood-Hanson machine is to drive the general operator 33 by an electrical motor 45, which is connected by a slip clutch 46 to a shaft 47 having a worm 48 meshing with a worm wheel 49. The motor may be in constant operation, although this is not essential. The revolving worm wheel 49 has a hub 50 loose upon a shaft 51, but connectible thereto by a clutch mechanism, so as to drive said shaft. It will be seen at Fig. 3 that the clutch tends constantly to close, but is restrained by a trip pin 52, which stands normally in the path of a lug 53 on a ring or segment 54, which encircles said hub 50, and restrains a clutching-roll 55, which normally occupies a recess 56, but is urged by a spring 57 into clutching connection between said hub 50 and a cup 58, which is fixed to said shaft 51. The restraining trip 52 may be withdrawn by depressing a key 59, Fig. 8, usually provided on the machine and having a stem 60 pivoted to a lever 61, which depresses one end of a lever 62, lifting up the other end 63 thereof, said end 63 engaging a slot 64 in the trip pin 52 to lift the same out of engagement with the lug 53. Hence by pressing said key 59, the shaft 51 is clutched to the revolving worm wheel 49, and makes a complete revolution. Upon said shaft 51 is a crank 65 (Figs. 7 and 9) having a wrist or block 66 engaging a vertically slotted slide 67, which has a head 68 engaging a yoke 69 secured to one of the general operator racks 33, Figs. 3 and 7. The slide 67 has horizontal supporting and guiding arms 70 working in bearings 71. Upon release of the key 59, the trip 52 drops into the path of the lug 53 and arrests the ring 54 and roll 55, so that the shaft 51 comes to rest with the general operator 33 in normal position.

All of the type-bars, including the bar which carries the "0" type, are operable not only by the keys, but also by a source of power, for the purpose of writing on the work sheet the number which is indicated by the dial wheels. For this purpose, each type bar is provided with a special operator in the form of a slide 72, having at its upper end a hook 73, to bear down a pin 74 provided upon the bottom of the key stem 18; said slide guided at its upper end in a slot 75 (Fig. 3) in a guide plate 76, and at its lower end forked at 77, Fig. 12, to destride a washer or collar 78 (Fig. 6) carried by a power-shaft 79. To each operator is connected an individual draw-spring 80, which is attached at its upper end to a pin 81 on the operator 72, and at its lower end to a fixed bar 82. The function of this spring is to throw the numeral type bar against the platen; but it is normally restrained from doing so by a wrist 83, which rests upon the high part of a snail or other cam 84, which is loosely mounted upon said power-shaft 79, and is connected thereto by a normally open clutch. This clutch is similar in construction and operation to the one heretofore described between the shaft 51 and the worm wheel 49; and it has a lug 85 (Figs. 3 and 6) similar to lug 53 and normally restrained by a latch 86, which has a returning spring 87; there being one clutch for each of the type bar operators 72. The clutching ball or roll 88, similar to roll 55, works between a loosely mounted shell 89 and a boss 90, which is fixed on the power-driven shaft 79, and corresponds to the part 50. A spring 91, corresponding to spring 57, tends to close the clutch. The cam 84 is fixed by a screw 92 to the shell 89. Hence when the lug 85 is released, the cam 84 turns clockwise at Fig. 12, the wrist 83 drops off the top part of the cam, and the spring 80 pulls down the operator 72, the key stem 18 and the type bar, causing the latter to strike the platen. The clutch and cam continue to rotate, forcing the wrist 83 again to the high part of the cam and returning or permitting the return of the type bar to normal position under the influence of the usual spring 93, Fig. 2.

The shaft 79 is connected to the main power-shaft 47 by a train of gearing comprising pinions 94 and 95, the latter upon a vertical shaft 96, Fig. 6, which carries at its end a pinion 97 in mesh with a pinion 98 on a horizontal shaft 99, which carries a pinion 100, in mesh with a pinion 101 on the power-shaft 47. By this means, the shaft 79 may be caused to rotate at a speed preferably less than that of the power shaft 47.

There are one clutch and one latch 86 for each of the ten numeral type bars. The control over the latches 86 is divided; the paper carriage 8 of the typewriter determining when the latch 86 is to be released and the type bar is to be operated, and the dial or computation wheels 26 selecting the type bar which is to operate.

The carriage 8 of the typewriter exercises its control through the dog 27, jacks 28, links 30 and levers 31, each of the latter having a downwardly extending arm 102, which by means of any suitable connections (illustrated as including a rod 103 (Figs. 3 and 10), lever 104, link 105, bell-crank 106 and link 107) may operate one of a set of levers 108 to lift a selector 109 to release one of the latches 86. These latches have arms 110 which overlie a set of linkages in position to be lifted by any thereof when the linkage is operated by the selector 109. These linkages include parallel links 111 and 112 pivotally connected by bell cranks 113, 114 (Fig. 6), so that the links 111 will move substantially vertically. The selectors 109 are shiftable individually to positions to engage teeth 115 thereon with any one of the links 111, and merely act as selecting interponents between the levers 108 and the set of linkages. The raising of a lever 108 raises a selector 109 of the same denomination, which in turn raises a link 111 so that the latter will carry its tooth 116 up into engagement with the associated latch arm 110, thereby disengaging the connected latch 86.

When, therefore, the dog 27 operates a jack 28, the members 30, 31 and 102 to 109 inclusive, are called into action to operate one of the linkages 111—114 to lift one of the latch arms 110, and permit the associated clutch to operate and the corresponding type-bar to be thrown to the platen.

It will be understood that at any position of the carriage within the computing field, any type-bar may be operated; and the method whereby the computing wheels select the type-bars will now be explained.

There is one of the selectors 109 for each of the dial wheels 26. At Fig. 3, the selector 109 is illustrated in position for controlling the operation of the "0" type-bar; but it is shiftable to the right to position for engagement of any of the remaining nine linkages, so that it may control the operation of any of the numeral type bars.

The shifting of the selector 109 is effected by a snail cam 117, which is fixed to its associated dial wheel 26; and a follower 118 is held by a spring 119 against the edge of said cam to swing to and fro as the dial wheel revolves. An arm 120 of this follower is connected by a link 121 to a lever 122, which has a pin-and-slot connection at 123 to the selector 109; the latter having preferably a foot 124 to slide on a table 125; and the lever 108 having a pinion 126 to engage and lift said selector 109 in any position to which the same may be adjusted by the snail cam 117.

The next movement of the dial wheel 26 in clockwise direction at Fig. 3, will permit the follower 118 to snap off from the high part of the cam to the low part thereof, the spring 119 thrusting the selector 109 toward the right, so that its tooth 115 may engage the extreme right hand linkage, the latter having a tooth 116 to engage the latch 86, which is associated with the "1" key stem 18, which is at the extreme left of Fig. 6. As the dial wheel 26 is rotated, the tooth 115 is presented successively to all of the other linkages; and at any time, it will be found that the tooth controls that linkage which corresponds with the number seen at the sight-opening 127 in the casing of the machine, Fig. 3.

The positions of the set of selectors 109 will repeatedly change during the operation of the machine; said selectors being always in positions to secure printing on the work sheet of the number which appears on the set of computing wheels at said sight-opening.

From the foregoing, it follows that whenever the carriage dog 27 operates a jack 28, the lever 108 is lifted to render effective that selector 109 which corresponds in denomination to the operater jack 28, and hence which corresponds to the denominational position of the carriage in the computing column. To illustrate; if the number 1325698 appears through the sight-opening 127, the selecting teeth 115 will stand at corresponding positions beneath the linkages 111–114; and if the carriage is then brought into the computing field, the dog 27 will operate the millions jack 28, and the connections (including the transposition device 107$^a$) to the millions lever 108, and that in turn will lift the millions selector 109 to raise the first linkage at the extreme right at Fig. 3, thus releasing the first latch 86 at the extreme left of Fig. 6, and causing the type-bar "1" to print and return to normal position; the spring 87 serving to reëngage the latch 86 with the dog 85, to release the clutch at the completion of one revolution thereof, with the operator 72 in normal position.

The movement of the type bar causes the paper carriage 8 to feed as the dog 27 moves to and depresses the hundred thousand jack 28, and through its connections the corresponding lever 108 is raised together with the corresponding selector 109, whose tooth now stands under the third linkage from the right at Fig. 3, whereby the third latch from the left at Fig. 6 is released, and the type bar "3" is thrown up to print. The carriage again feeds, and the operation continues until the entire number is written upon the work sheet which appears at the sight opening.

As the principal use of the device is to write upon the work sheet the total of a computation, a lever 128 may be swung forwardly at Fig. 3, to thrust back a link 129 and swing back an arm 130 rising from a rock shaft 131 journaled in the framework of the machine, and carrying a plate or bar 132 having openings or slots 133 for the rods 103; the described movement of the plate 132 causing all of the rods 103 to swing down out of the paths of the arms 102, thereby silencing or disconnecting the power-operated printing mechanism.

The motor 45 is preferably intermittent, as set forth in pending application No. 650,700, filed September 22, 1911, now patent No. 1,237,900, dated August 21, 1917. Conductors 139 and 135, Fig. 11, leading to the clutch, control switches, as set forth in said application. In order to start the motor when it is desired to write a number by means of the motor-driven mechanism, a circuit closer 136 is placed on the link 129 to bridge a pair of terminals 137, 138 provided upon wires 139, 140, which lead from the conductor 134 to the motor 45. The part 136 may have a notch 141, so that the spring 142 may press the terminal 137 into the notch to detain the link 129 and the lever 128 in working positions.

It will be seen then after a series of computing operations involving one or more computations which give a resultant to be written on the work-sheet as a sub-total or total, it is merely necessary to adjust the typewriter carriage either before or after the operation of the lever 128, with the denominational or order column at the printing point for the first denomination in the computing head exhibiting a digit to be transferred. The operation of the lever 128 will connect up the motor, so that the first numeral key corresponding to the first digit exhibited will be actuated by the cross selection of the denomination-selecting mechanism and the digit-selecting mechanism, controlled, respectively, from the carriage and the dial wheels, thereby printing this digit. The carriage spaces automatically, and the next digit will be printed, and so on until the whole series of digits exhibited are printed. The automatic passing of the typewriter carriage outside of the computing zone and thus outside of the range of the jacks 27, stops the printing of any further digits than those exhibited by the computing wheels of the register.

Variations may be resorted to within the scope of the invention, and portions of the improvements may be used without others.

Having thus described my invention, I claim:

1. The combination of a set of independently settable computation devices, a series of numeral type bars, power-driven mechanism for operating said type-bars, and type-bar selecting devices controlled by said computation devices.

2. The combination of a set of independently settable devices, a series of numeral keys, means associated with said keys for setting up a number on said settable devices, a series of numeral types mounted to print at a common printing point, a letter-feeding carriage, and means controlled jointly by said settable devices and said carriage for coöperating with said types to print the number that is set up on said settable devices.

3. The combination of a set of numeral types, a carriage, a set of computation wheels, a set of type operators, and mechanism for causing the operation of said type-operators one at a time to print the number which is set up on the computation wheels; said mechanism including means for enabling each dial wheel to select the type which is to be printed, and also including means to enable the carriage to determine the order or time of operation of the type-selecting devices.

4. The combination of a set of numeral types, a carriage, a set of computation wheels, and mechanism for causing the operation of said types one at a time to print the number which is set up on the computation wheels; said mechanism including means to enable the carriage to determine which dial wheel shall act, and in what column or place the digit shall be printed, and also including means to enable the selected dial wheel to determine which digit shall be used.

5. The combination of a set of computing devices, a set of numeral types, a letter-feeding carriage, and power-driven means controlled jointly by said carriage and said computing wheels for selecting and operating the types to print the number which is indicated by or set up on said computing devices.

6. The combination of a set of computing wheels, a set of numeral types, a letter-feeding carriage, power-driven means under the control of the carriage for effecting operation of said types, and means under the control of said computing wheels to select the types to be operated.

7. The combination with a set of numeral types and a set of type-operators, of a source of power, means for connecting said operators independently of one another to said source of power, a series of computing wheels, and selecting mechanism extending from said computing wheels to said connecting means.

8. The combination with a set of numeral types and a set of type-operators, of a source of power, means for connecting said operators independently of one another to said source of power, a series of computing wheels, selecting mechanism extending from said computing wheels to said connecting means, and means for controlling the operation of the selected operators so that the type bars are operated one at a time.

9. The combination with a set of numeral types and a set of type operators, of a power shaft or member, normally open individual clutches between said operators and said power shaft, a letter-feeding carriage, a set of computation wheels, and means controlled jointly by said carriage and said computation wheels for closing said clutches.

10. The combination with a set of numeral types and a set of type operators, of a power shaft or member, normally open individual clutches between said operators and said power shaft, a letter-feeding carriage, a set of computation wheels, and means controlled jointly by said carriage and said computation wheels for closing said clutches, means being provided for automatically opening each clutch after the operation of its type bar.

11. The combination with a set of numeral types and a set of type operators, of a power shaft or member, normally open individual clutches between said operators and said power shaft, a letter-feeding carriage, a set of computation wheels, selecting means extending from said computation wheels to said clutches, and means controlled through said carriage for causing the selected clutches to be closed.

12. The combination with a set of numeral types and a set of type-operators, of a power shaft, normally open individual clutches between said operators and said power shaft; said clutches normally tending to close; latches restraining the clutches from closing, a set of computation wheels, selecting devices extending from said computation wheels to said latches, a letter-feeding carriage, and means controlled through said carriage for releasing said latches one at a time.

13. The combination with a set of numeral types and a set of type-operators, of a series of computation wheels, means to enable each wheel to select that operator which corresponds to the rotative position of the wheel, and means for operating consecutively, beginning with the highest denomination, the selected types to print the number which is set up on the wheels.

14. The combination with a set of numeral types and a set of type operators, of a series of computation wheels, means to enable each wheel to select that operator which corresponds to the rotative position of the wheel, and means including a step-by-step feeding carriage and a set of actuators operable consecutively thereby, for operating consecutively, beginning with the highest denomination, the selected operators, to cause the types to print the number which is set upon the wheels.

15. The combination of a set of numeral types, a set of operators therefor, a source of power common to said operators but disconnected therefrom, means tending normally to connect said operators to said source of power, latches normally restraining said connecting means, a set of latch-releasers, a set of selectors, a set of computation wheels, means for causing each selector to move separately into position for engagement with that releaser which corresponds to the rotative position of its computation wheel, and means for operating the selectors to release the latches.

16. The combination of a set of numeral types, a set of operators therefor, a source of power common to said operators but disconnected therefrom, means tending normally to connect said operators to said source of power, latches normally restraining said connecting means, a set of latch-releasers, a set of selectors, a set of computation wheels, means for causing each selector to move separately into position for engagement with that releaser which corresponds to the rotative position of its computation wheel, a letter-feeding carriage, and means controlled thereby for operating the selectors in succession at successive feeding movements of the carriage, to cause the types to print one at a time.

17. The combination with a carriage and a single decimal set of ten numeral types, of ten type-bar operators, computing mechanism including dial wheels or devices, snail cams for said dial wheels, selectors moved by said cams in one direction, springs for moving said selectors in the opposite direction, operators for said types, the construction being such that said selectors are held by said cams and springs in position to engage or control the type operators which correspond to the numbers which are set up on the dial wheels, a dog upon said carriage, and a series of devices operable successively by said dog to cause said type operators to become effective in succession.

18. The combination of a set of numeral types, a set of operators therefor, a set of devices for controlling said operators, a set of selectors, a set of computation wheels, cams for said wheels, springs for coöperating with said cams to move said selectors into position for engagement with different controlling devices according to the positions of the wheels and cams, and means for operating the selected controlling devices to cause the corresponding types to print.

19. The combination of a set of numeral types, a set of normally idle power-driven operators therefor, a set of devices to control the operation of said operators, a set of selectors, a set of computation wheels, cams for said wheels, springs for coöperating with said cams to move said selectors into position for engagement with different controlling devices according to the positions of the wheels and cams, and means for operating the selected controlling devices to cause the corresponding types to print.

20. The combination of a set of numeral types, a set of operators therefor, a source of power common to said operators but disconnected therefrom, means tending normally to connect said operators to said source of power, latches normally restraining said connecting means, a set of latch-releasers, a set of selectors, a set of computation wheels, cams for said wheels, springs for coöperating with said cams to move said selectors into positions for engagement with different releasers according to the positions of the wheels, and means for operating the selectors to release the latches.

21. The combination of a set of numeral types, normally restrained spring-driven operators for said types, a set of numeral wheels, and means coöperating with said wheels to release the operators to print the number which is set up on the wheels.

22. The combination of a set of numeral types, normally restrained spring-driven operators for said types, a set of numeral wheels, means coöperating with said wheels to release the operators to print the number which is set up on the wheels, and means for restoring the operators to normal positions.

23. The combination of a set of numeral types, normally restrained spring-driven operators for said types, a power-driven shaft, cams for releasing and restoring said operators, normally open clutches between said shaft and said cams, and means coöperating with said wheels to close the clutches and cause the number to be printed which is set up on the wheels.

24. The combination of a set of numeral types, normally restrained spring-driven operators for said types, a power-driven shaft, cams for releasing and restoring said operators, normally open clutches between said shaft and said cams, means tending to close said clutches, latches restraining said clutches from closing, computation wheels and means coöperating with said wheels to release the latches to cause the number to be printed which is set up on the wheels.

25. The combination of a set of numeral types, normally restrained spring-driven operators for said types, a power-driven shaft, cams for releasing and restoring said operators, normally open clutches between said shaft and said cams, means tending to close said clutches, latches restraining said clutches from closing, and means coöperating with said wheels to release the latches to cause the number to be printed which is set up on the wheels; means being provided to reëngage each latch upon the completion of a cycle of movements of its associated type operator.

26. The combination of a letter-feeding carriage, a set of numeral types, operators for said types, a power shaft, normally open clutches for said power shaft, means tending to close said clutches, means operable through said clutches to cause the operation of said type operators, latches to restrain said clutches from closing, selectors controlled by said computation wheels, said latches releasable by said selectors, a dog on said carriage, and members operable in succession by said dog to operate said selectors to release the latches one at a time.

27. The combination of a letter-feeding carriage, a set of numeral types, operators for said types, a power shaft, normally open clutches for said power shaft, means tending to close said clutches, means operable through said clutches to cause the operation of said type operators, latches to restrain said clutches from closing, selectors controlled by said computation wheels, said latches releasable by said selectors, a dog on said carriage, and members operable in succession by said dog to operate said selectors to release the latches one at a time; said latches having arms, and a set of linkages being associated respectively with said arms to release said latches; said linkages intervening between said selectors and said arms, and any of said linkages operable by means of any of said selectors.

28. The combination of a letter-feeding carriage, a set of numeral types, operators for said types, a power shaft, normally open clutches for said power shaft, means tending to close said clutches, means operable through said clutches to cause the operation of said type operators, latches to restrain said clutches from closing, selectors controlled by said computation wheels, said latches releasable by said selectors, a dog on said carriage, and members operable in succession by said dog to operate said selectors to release the latches one at a time; said latches having arms, and a set of linkages being associated respectively with said arms to release said latches; said linkages intervening between said selectors and said arms, and any of said linkages operable by means of any of said selectors, each linkage comprising upper and lower links and bell cranks or idle links connecting the same.

29. The combination of a letter-feeding carriage, a set of numeral types, operators for said types, a power shaft, normally open clutches for said power shaft, means tending to close said clutches, means operable through said clutches to cause the operation of said type operators, latches to restrain said clutches from closing, selectors controlled by said computation wheels, said latches releasable by said selectors, a dog on said carriage, members operable in succession by said dog to operate said selectors to release the latches one at a time; said latches having arms, and a set of linkages being associated respectively with said arms to release said latches; said linkages intervening between said selectors and said arms, and any of said linkages operable by means of any of said selectors, each linkage comprising upper and lower links and bell cranks or idle links connecting the same, each of the lower links being engageable by any of said selectors, and each of the upper links having a tooth to engage with its associated latch arm, said link teeth disposed across the machine, each beneath its associated latch arm.

30. The combination, with a typewriting machine having numeral types, operating members therefor, and a traveling carriage; of computing mechanism including a set of dial wheels, and denomination-selecting means for the same controlled by said carriage during its movement through a computing zone; and means controlled by said carriage and said dial wheels, through said selecting means, for actuating the type-operating members corresponding to the digits set up on the successive dial wheels to print the number registered.

31. The combination of a set of independently settable devices, a series of numeral keys, means associated with said keys for setting up a number on said settable devices, a series of numeral types mounted to print at a common printing point, a letter-feeding carriage, means controlled jointly by said settable devices and said carriage for coöperating with said types to print the number that is set up on said settable devices, and means for effecting disconnection between said carriage and said jointly controlled means.

32. The combination of a set of numeral types, a carriage, a set of computation wheels, a set of type operators, mechanism for causing the operation of said type-operators one at a time to print the number which is set up on the computation wheels; said mechanism including means for enabling each dial wheel to select the type which is to be printed, and also including means to enable the carriage to determine the order or time of operation of the type-selecting devices, and means for silencing the type operating mechanism by effecting a disconnection between the carriage and the printing devices.

33. The combination of a set of computing devices, a set of numeral types, a letter-feeding carriage, and power-driven means controlled jointly by said carriage and said computing wheels for selecting and operating the types to print the number which is indicated by or set up on said computing devices; said power-driven means including devices disconnectible from said carriage at will to silence the type-operating means.

34. The combination with a set of numeral types and a set of type-operators, of a power shaft, normally open individual clutches between said operators and said power shaft; said clutches normally tending to close; latches restraining the clutches from closing, a set of computation wheels, selecting devices extending from said computation wheels to said latches, a letter-feeding carriage, means controlled through said carriage for releasing said latches one at a time, and a manually operable device for disconnecting said carriage from said releasing means to silence said type-operators.

35. The combination with a carriage and a set of ten numeral types, of ten type-bar operators, computing mechanism including dial wheels or devices, snail cams for said dial wheels, selectors moved by said cams in one direction, springs for moving said selectors in the opposite direction, operators for said types, the construction being such that said selectors are held by said cams and springs in position to engage or control the type operators which correspond to the numbers which are set up on the dial wheels, a dog upon said carriage, a series of devices operable successively by said dog to cause said type operators to become effective in succession, and means for disabling said devices operable by said dog to prevent said type-operators from becoming effective.

36. A typewriting and computing machine comprising numeral keys, types controlled by said keys, computation wheels, racks or bars for operating said wheels, a dog on said carriage, jacks operable by said dog and connected to said racks or bars to displace the same, pins on said bars settable by said keys when the bars are displaced, operators for said numeral types, selectors controlled by said numeral wheels for controlling said operators, and a set of devices controlled by said jacks for operating said selectors to cause said types to print one at a time as said carriage feeds.

37. A typewriting and computing machine comprising numeral keys, types controlled by said keys, computation wheels, racks or bars for operating said wheels, a dog on said carriage, jacks operable by said dog and connected to racks or bars to displace the same, pins on said bars settable by said keys when the bars are displaced, operators for said numeral types, selectors controlled by said numeral wheels for controlling said operators, and a set of devices controlled by said jacks for operating said selectors to cause said types to print one at a time as said carriage feeds, and means for disconnecting said selector-operating devices from said jacks.

38. A typewriting and computing machine comprising numeral keys, types controlled by said keys, computation wheels, racks or bars for operating said wheels, a dog on said carriage, jacks operable by said dog and connected to said racks or bars to displace the same, pins on said bars settable by said keys when the bars are displaced, operators for said numeral types, selectors controlled by said numeral wheels for controlling said operators, a shaft for said operators, a set of devices controlled by said jacks for operating said selectors to cause said types to print one at a time as said carriage feeds, a motor for operating said shaft, and means for concomitantly silencing said motor and said selector-operating devices.

39. A typewriting and computing machine comprising numeral keys, types controlled by said keys, computation wheels, racks or bars for operating said wheels, a dog on said carriage, jacks operable by said dog and connected to said racks or bars to displace the same, pins on said bars settable by said keys when the bars are displaced, operators for said numeral types, selectors controlled by said numeral wheels for controlling said operators, a shaft for said operators; said shaft being power-driven, a lever, and means to enable said lever to control the operation of said shaft and of said selector-operating devices.

40. The combination of a typewriter carriage, a set of numeral types, a power shaft, a set of cams, normally open clutches connecting said cams to said power shaft, a set of type operators having wrists to engage said cams, springs to cause said operators to bring the types to the printing point, a computation mechanism including a set of wheels, and means controlled jointly by said wheels and said carriage to effect the closing of said clutches one at a time, to cause said types to print a number which is set up on the wheels.

41. The combination of a typewriter carriage, a set of numeral types, a power shaft, a set of cams, normally open clutches connecting said cams to said power shaft, a set of type operators having wrists to engage said cams, springs to cause said operators to bring the types to the printing point, loose connections between said operators and said types, to permit the types to print independently of the operators, a computation mechanism including a set of wheels, and means controlled jointly by said wheels and said carriage to effect the closing of said clutches one at a time, to cause said types to print a number which is set up on the wheels.

42. The combination of a typewriter carriage, a set of numeral types, a power shaft, a set of cams, normally open clutches connecting said cams to said power shaft, a set of type operators having wrists to engage said cams, springs to cause said operators to bring the types to the printing point, each of said operators in the form of a slide having a hoop, type-operating key-stems having parts to be engaged by said hooks, a computation mechanism including a set of wheels, and means controlled jointly by said wheels and said carriage to effect the closing of said clutches one at a time, to cause said types to print a number which is set up on the wheels.

43. The combination of a set of numeral types, a carriage, a set of computation wheels, a set of type operators, and mechanism for causing the operation of said type-operators one at a time to print the number which is set up on the computation wheels; said mechanism including means for enabling each dial wheel to select the type which is to be printed, and also including means to enable the carriage to determine the order or time of operation of the type-selecting devices; said types operable independently of said operators.

44. The combination of a set of numeral types, a carriage, a set of computation wheels, a set of type operators, and mechanism for causing the operation of said type-operators one at a time to print the number which is set up on the computation wheels; said mechanism including means for enabling each dial wheel to select the type which is to be printed, and also including means to enable the carriage to determine the order or time of operation of the type-selecting devices; said types operable independently of said operators and connected to the computing wheels to write the numbers which are set up on the computing wheels.

45. The combination with a set of numeral types and a set of type-operators, of a power shaft, normally open individual clutches between said operators and said power shaft; each of said clutches having a lug and comprising clutching members which tend normally to close, latches restraining said clutches by means of said lugs, a set of computation wheels, selecting devices extending from said computation wheels to said latches, a letter-feeding carriage, and means controlled through said carriage for releasing said latches one at a time.

46. The combination with a computing mechanism, including a set of computing wheels, of a set of numeral types, means to operate the same one at a time, means controlled by said wheels for determining the order in which the types are to be operated, to print the number which is disclosed by or set up on said computing wheels or devices, and keys for operating said types independently of said type-operating means; said keys connected to control said wheels.

47. The combination of a set of independently settable computation wheels or devices, a series of numeral type bars, power driven mechanism for operating said type bars, type-bar selecting devices controlled by said computation wheels or devices, a set of keys, said type bars operable by said keys independently of said type-bar operating mechanism, and means for enabling said keys to control the setting of said wheels.

48. The combination of a set of independently settable computation wheels or devices, a series of numeral type bars, power driven mechanism for operating said type bars, type-bar selecting devices controlled by said computation wheels or devices, a set of keys, said type bars operable by said keys independently of said type-bar operating mechanism, means for enabling said keys to control the setting of said wheels, and means for silencing said power driven mechanism.

49. The combination of a set of independently settable devices, a series of numeral keys, means associated with said keys for setting up a number on said settable devices, a series of numeral types mounted to print at a common printing point, a letter feeding carriage and means controlled jointly by said settable devices and said carriage for coöperating with said types to print the number that is set up on said settable devices; said types being operable by said keys independently of said type-operating means.

50. The combination of a set of numeral keys, computing devices and numeral types controlled by said keys, a letter-feeding carriage also controlled by said keys, and power-driven means controlled jointly by said carriage and said computing wheels for selecting and operating the types to print the number which is indicated by or set up on said computing devices.

51. The combination of a set of computing wheels or devices, a set of numeral types, a letter-feeding carriage, power-driven means under the control of the carriage for effecting operation of said types, and means under the control of said computing wheels to select the types to be operated; and keys having means for operating said types independently of said power-driven means; said carriage and said computing wheels also controlled by said keys.

52. The combination with a set of numeral types and a set of type-operators, of a source of power, means for connecting said operators independently of one another to said source of power, a series of computing wheels, selecting mechanism extending from said computing wheels to said connecting means, and means for controlling the operation of the selected operators so that the type bars are operated one at a time, and keys having means for operating said types independently of said operators; connections being provided between said keys and said wheels.

53. The combination of a set of numeral types, a set of operators therefor; a source of power common to said operators but disconnected therefrom, means tending normally to connect said operators to said source of power, latches normally restraining said connecting means, a set of latch-releasers, a set of selectors, a set of computation wheels, means for causing the selectors to move into positions for engagement with those releasers which correspond to the rotative positions of the computation wheels, a letter-feeding carriage, means controlled thereby for operating the selectors in succession at successive feeding movements of the carriage, to cause the types to print one at a time, a set of keys having means for operating said types independently of said operators, and means for enabling the keys to determine the extent of rotation of the computation wheels.

54. The combination of a set of numeral types, a set of normally idle power-driven operators therefor, a set of devices to control the operation of said operators, a set of selectors, a set of computation wheels, cams for said wheels, springs for coöperating with said cams to move said selectors into position for engagement with different controlling devices according to the positions of the wheels and cams, and means for operating the selected controlling devices to cause the corresponding types to print, a set of keys having means for operating said types independently of said operators, and means for enabling the keys to determine the extent of rotation of the computation wheels.

55. The combination of a set of numeral types, a set of operators therefor, a source of power common to said operators but disconnected therefrom, means tending normally to connect said operators to said source of power, latches normally restraining said connecting means, a set of latch-releasers, a set of selectors, a set of computation wheels, cams for said wheels, springs for coöperating with said cams to move said selectors into positions for engagement with different releasers according to the positions of the wheels, and means for operating the selectors to release the latches, a set of keys having means for operating said types independently of said operators, and means for enabling the keys to determine the extent of rotation of the computation wheels.

56. The combination of a set of numeral types, normally restrained spring-driven operators for said types, a set of numeral wheels, means coöperating with said wheels to release the operators to print the number which is set up on the wheels, means for restoring the operators to normal positions and keys having means to operate said types independently of said spring-driven operators.

57. The combination of a set of numeral types, normally restrained spring-driven operators for said types, a power-driven shaft, cams for releasing and restoring said operators, normally open clutches between said shaft and said cams, means tending to close said clutches, latches restraining said clutches from closing, computation wheels, means coöperating with said wheels to release the latches to cause the number to be printed which is set up on the wheels, means being provided to reëngage each latch upon the completion of a cycle of movements of its associated type operator, and computation keys having means to operate said types independently of said operators.

58. In a computing machine, the combination with a single set of digit type and a traveling carriage, of computing devices, and carriage-actuated means for causing the operation of said type to record a number set up on said computing devices.

59. In a computing machine, the combination with a single set of digit type and a traveling carriage, of computing devices, keys for setting up numbers in said computing devices and operating said type, a carriage-controlled selecting mechanism for selecting the computing wheel, and means for enabling said selecting mechanism to cause an operation of said type according to the numbers set up in said computing wheels.

60. In a combined typewriting and computing machine, the combination with numeral keys and a traveling carriage, of computing wheels, a selecting device for determining by said carriage on which of said wheels said numeral keys shall set up a number, type operated by said keys, and means for causing said selecting device to cause said type to be automtically operated according to the number set up.

61. In a combined typewriting and computing machine, the combination with a traveling carriage and numeral keys, of computing wheels, numeral types operated by said keys, a source of power, means for setting up in said wheels numbers written by said type, and means automatically operated by the positioning of said carriage in a computing zone for causing said source of power to operate said type according to the numbers set up in said computing wheels.

62. In a computing machine, the combination with numeral keys and a traveling carriage, of an array of computing devices, a series of levers moved by said carriage to determine on which of said computing devices said keys shall be operative at any one time, numeral type, and a selecting device operated by said levers for causing a source of power to operate said numeral type.

63. In a computing machine, the combination with an array of computing wheels and numeral keys, of a traveling carriage, a series of levers for determining on which of said computing wheels said keys shall operate, extensions on said levers, a source of power, a selecting device controlled by said extensions, and means for causing said computing wheels to cause the operation of said keys as determined by said selecting device.

64. In a computing machine, the combination with numeral keys and a series of computing wheels, of a traveling carriage, a selecting device comprising a plurality of levers, one lever for each computing wheel, said levers having extensions thereon, a second selecting mechanism, a series of bars controlling said second selecting mechanism, and a comb through which said bars extend arranged to move said bars into and out of coöperative relation with said extensions.

65. In a combined typewriting and computing machine, the combination with numeral keys and computing wheels, of numeral type operated by said keys, mechanism normally ineffective for operating said type, selecting devices, and a finger-piece movable to bring a selecting device into coöperative relation with the particular mechanism so as to cause said type to be operated to be determined by the computing wheels.

66. In a computing machine, the combination with a power-driven controlling member, of an array of clutches normally open on said power-driven member but normally tending to close, a latch for each clutch, numeral keys, controlling connections between said power-driven member and said keys, operated by the former, computing wheels, a traveling carriage, and means for moving said latches selectively by said computing wheels and traveling carriage.

67. In a combined typewriting and computing machine, the combination, with type-controlling numeral keys, and a traveling carriage; of a set of computing wheels; a selecting device for the numeral keys; an operating device for the selecting device; a connection between said carriage and said operating device for actuating the latter from said carriage during its travel; and an individual connection between each computing wheel and said selecting device, for controlling the action of the said selecting device.

68. In a combined typewriting and computing machine, the combination with a power-driven shaft, of an array of clutches on said shaft, a latch for each clutch holding it normally open, a traveling carriage, computing wheels, and selecting means controlled by said carriage and said wheels for releasing said latches selectively.

69. In a computing machine, the combination with computing wheels and a traveling carriage, of numeral type individually operable, a selecting device always held in position by each computing wheel for determining what type shall be operated, and a selecting device connectible to said carriage for making said wheel-controlled selectors effective to cause the operation of said type.

70. In a combined typewriting and computing machine, the combination, with type-operating numeral keys, and a set of computing wheels; of driving means for said wheels; differential mechanism actuated by said keys during the writing of a number, for controlling the extent of rotation of said wheels in conformity with the numbers so written; a power device for operating said driving means; and a set of devices under the control of said power device, for automatically operating said keys, to cause them to record the totals of the numbers successively registered on said wheels.

71. In a combined typewriting and computing machine, the combination with a series of denomination-selecting members, of a traveling carriage, a tappet on said carriage for operating said members *seriatim*, a set of computing wheels, devices under the selective control of said members for driving said wheels, bars arranged to be operated by said selecting members, a selector for said bars, and means under the control of said bars for printing numbers registered on said wheels.

72. In a computing machine, the combination with a series of computing wheels, of numeral keys, a shaft extending transversely of said numeral keys, a clutch on said shaft for each of said keys, a traveling carriage, a latch holding each clutch normally open, and a selecting device controlled by said carriage and said computing wheels for selectively releasing said latches.

73. In a computing machine, the combination with a gang of computing wheels, of a selecting bar controlled by each computing wheel, links to be selected by said bars, a bell crank at each end of said links so that said links swing parallel to themselves, a tie connecting the other arm of each pair of bell cranks for causing the two ends of each link to move in unison, and bars comprising heads engaged and moved by the computing wheels for actuating the selecting bars.

74. In a writing machine, the combination with types printing *seriatim*, of dial wheels for adding the numbers written, linkages controlling said types, and a dial wheel cam varying in its position with the position and exhibition of the wheels, and which keeps the proper linkage constantly selected, for printing the number shown on the dial wheels.

75. In a writing machine, the combination with type-bars and total wheels, of keys for writing by said bars and registering in said wheels, a link for each key for operating it, a cam on each wheel for automatically selecting a type-bar link, a fork for guiding purposes on each link, and means operating automatically during the writing of a total for pulling down the corresponding type-bar operating link selected by the cam of the effective wheel.

76. In a computing machine, the combination with a traveling carriage, computing wheels and numeral keys for determining how far said computing wheels shall be turned, of a dog on said carriage, types under the control of said computing wheels, and connections between said dog and said types for automatically effecting printing by said types during the run of the carriage, said dog settable to determine the point at which such automatic printing shall take place.

77. In a computing machine, the combination, with a traveling carriage, and a totalizer comprising a set of denominational dial wheels; of printing type; and coöperating denominational connections between the carriage and the dial wheels to automatically cause type to commence printing of the total shown on said dial wheels when said carriage reaches a point in its travel where the connection of highest denominational order becomes active.

78. In a computing machine the combination with a denominational-selector; of a set of type-operating numeral keys; computing mechanism including a set of dial wheels; and means controlled partly by said selector and partly by said dial wheels for causing said keys to automatically print the number registered on said wheels.

79. In a computing machine, the combination, with a set of dial wheels; and driving means therefor; of type-operating numeral keys; and automatic actuating mechanism for said keys controlled in part by said dial wheels to selectively cause said keys to print the number registered on said wheels.

80. In a computing machine, the combination with type-controlling numeral keys, computing wheels and a traveling carriage movable step by step under the control of said keys, of means under the control of said computing wheels for selecting types, and means under the control of said carriage during its step-by-step movement for bringing about the operation of the selected types one after another, commencing with the type selected by a predetermined wheel and continuing with those selected by the remaining wheels in order.

81. In a computing machine, the combination with a computing wheel and a traveling carriage, of types selectable by said computing wheel, means for automatically causing the selected type to print, and means connected to said carriage for causing the feeding of said carriage, to make said automatic means effective for said type only once.

82. In a computing machine, the combination with computing wheels and printing types, of a traveling carriage, a device on said carriage to cause said types to be selected by said computing wheels, and connections whereby the movement of said carriage to the initial point of writing a number will cause said device to be effective to cause the automatic feeding of said carriage and the printing of the remainder of said number.

83. The combination with a typewriting mechanism writing character by character, of a computing mechanism coöperating with said typewriting mechanism to compute the digits of numbers printed by said typewriting mechanism and eventually exhibit the resultant of a computation, and automatic actuating mechanism for said typewriting mechanism operating under the control of said computing mechanism so as to write accurately digit by digit the resultant exhibited by said computing mechanism.

84. The combination with typewriting mechanism, of computing mechanism controlled by said typewriting mechanism, and actuating mechanism for said typewriting mechanism controlled from said computing mechanism, whereby said typewriting mechanism will be operated to reproduce a certain sequence of operations determined by said computing mechanism.

85. The combination with computing mechanism arranged to exhibit the resultant of a computation, of type actions for printing numbers digit by digit, and selective actuating means automatically operating said type actions according to a predetermined sequence determined by said computing mechanism.

86. The combination with typewriting mechanism printing digit by digit in successive denominations, the digits of a number, of computing mechanism for computing and eventually exhibiting the resultant of all of the digits written by said typewriting mechanism, said computing mechanism including dial wheels, each arranged to exhibit one digit of the resultant, actuating means for operating said typewriting mechanism, and selecting means for causing the operation of said typewriting mechanism by said actuating means in an order of succession predetermined by the digits exhibited by said dial wheels when printing in the denominations corresponding to said dial wheels.

87. The combination with a typewriting mechanism including a set of digit type actions from "0" to "9", and a carriage traveling to determine denominational selections, of computing mechanism coöperating with said typewriting mechanism to effect a combined typewriting and computing operation, and including dial wheels arranged to exhibit the resultant of a computation, individual power actuators for each of said digit type actions, and cross-selecting mechanism controlled from said carriage as to the denomination, and from said dial wheels as to the digit for determining successive automatic actions of said power actuators to operate said type actions in any successive order to print digit by digit the resultant exhibited by said dial wheels.

88. The combination, with a typewriting machine and a computing device, of a series of cams controlled according to the dials of the computing device, and mechanism connecting such cams with the key levers of the typewriter for actuating the numeral keys according to the indications of the computer.

89. The combination, with a typewriting machine, of a computing device including a series of cams, a series of bars positioned by said cams, and means for actuating said bars to operate the numeral key bars of the typewriter.

90. The combination, with a typewriting machine, of a computing device coacting with the numeral keys of the typewriting machine, a series of bails connected with the respective key levers of the numeral keys, a series of cams connected with the dial wheels of the computer, bars extending transversely of the bails, mechanism controlled by the cams for controlling the position of the bars, and mechanism for operating said bars to operate the bails and thereby the key levers and type bars.

91. In a calculating machine, the combination of, a set of numeral printing bars, a set of keys, a set of displaceable elements adapted to be operated by said keys, and automatic mechanism for operating said bars successively in a sequence determined by the position of said displaceable elements.

92. In a calculating machine, the combination of, a set of numeral printing bars, a set of displaceable elements, and automatic mechanism for operating said bars successively in a sequence determined by the position of said displaceable elements.

93. In a calculating machine, the combination of a set of numeral printing bars, a set of displaceable elements, carrying mechanism coöperating with said displaceable elements, a set of keys, mechanism connecting said keys and displaceable elements and automatic mechanism for operating said bars successively in a sequence determined by the position of said displaceable elements.

94. In a calculating machine, the combination of, a set of numeral printing bars, a set of number wheels, a set of displaceable elements positively connected to said number wheels, and automatic mechanism for operating said bars successively in a sequence determined by said displaceable elements.

95. In a calculating machine, the combination of, a set of numeral printing bars, a set of number wheels, a set of cams positively connected thereto and automatic mechanism for operating said bars successively in a sequence determined by the position of said cams.

96. In a calculating machine, the combination of a set of numeral printing bars, a totalizer including a set of displaceable elements, tens carrying mechanism connecting said displaceable elements, and automatic mechanism for operating said bars successively in a sequence determined by the position of said displaceable elements.

97. In a typewriting calculating machine, the combination of a set of types adapted to print a number on a work-sheet, a key corresponding to each type, two means for bringing each of said types to the printing position, automatic means whereby the types may be brought to the printing position without manual actuation of the keys, and means whereby each type may be moved to the printing position by manual depression of the corresponding key.

98. In a calculating machine, the combination of a set of displaceable elements, printing means including a single set of figure types, and automatic mechanism for bringing said printing means into coöperation with said displaceable elements *seriatim* whereby the number represented by said set of displaceable elements may be automatically printed by said single set of type.

99. In a calculating machine, the combination of a set of displaceable elements, a set of keys, a key-controlled means for operating said displaceable elements, printing means provided with a single set of figure types, and automatic mechanism for bringing said printing means into coöperation with said elements *seriatim* whereby the number set up by the keys may be automatically printed by said single set of type.

100. In a calculating machine, the combination of a set of displaceable elements, carrying mechanism connecting said displaceable elements, a set of keys operatively connected with said displaceable elements, printing means provided with a single set of figure types, and automatic mechanism for bringing said printing means into coöperation with said displaceable elements *seriatim* whereby the total represented by said set of displaceable elements may be automatically printed by said single set of type.

101. In a typewriting machine, the combination with types for printing differentiated characters, of actuating mechanism for selectively causing said types to print, said actuating mechanism comprising a series of links, each having a controlling relation with a different one of said types, a series of separately-movable selector-bars, each having a head capable of being brought into coöperative relation with any selected one of said links, and means for operating said bars so as to cause the selected links to be operated, and thereby effect a printing actuation of the types controlled by the selected links.

102. In a typewriting machine, the combination with type-bars and keys for operating them, of a selecting device comprising a plurality of links, a plurality of bars extending across said links, heads on said bars, means for shifting said bars so that said heads will selectively coöperate with selected links, lifters for raising said links by said bars, springs for operating said keys, and selectively-operable latches normally restraining said springs but released by operation of said heads.

103. In a typewriting machine, the combination with keys, of a power-driven device, a spring constantly tending to cause each key to operate its type, a stop normally preventing said operation, a clutch for each stop on said power-driven device arranged to move said stop to ineffective position, to enable the spring to operate the key, and then to retension the spring, and means for selectively operating said clutches.

104. In a typewriting machine, the combination with types for printing differentiated characters and actuating mechanism for selectively causing said types to print, of means, including a motor, for driving said actuating mechanism, means, including denomination-selecting mechanism, for controlling the connections between said driving means and selected types, a key, and means controlled thereby for establishing a controlling relation between said denomination-selecting mechanism and said driving connections, and for concomitantly closing the circuit through said motor.

105. In a typewriting machine, the combination with a power-driven shaft, of a plurality of clutches on said shaft, latches holding said clutches normally open, bell-crank extensions of said latches, links extending transversely of said bell-cranks, a projection on each link corresponding to one bell-crank, bars shiftable transversely of said links, a head on each of said bars, a traveling carriage, arms moved by said traveling carriage, and connections therefrom adapted to raise the heads on said bars to operate their associated latches.

106. In a typewriting machine, the combination with type-bars, keys for operating them and a power-driven shaft, of a series of clutches thereon, a latch for each clutch holding it normally open, a spring tending to operate each key but restrained by the open clutch, bell-crank extensions on said latches, selecting links extending transversely of said bell-cranks, selecting arms extending transversely of said links, and an interponent interposable between said arms and links to close a clutch and permit the operation of a key thereby.

107. In a typewriting machine, the combination with a printing key and a power-device for operating it, of a rotatable cam normally holding said key against operation, a clutch connected to said cam, a power-shaft for driving said cam by said clutch, and means for connecting said cam by said clutch to said power-shaft, to cause the pewer-device to operate said key and to again put said key under the control of said power-device.

108. In a typewriting machine, the combination with a type, of power-driven actuating means therefor, said actuating means including a spring normally tending to render said actuating means effective to cause said type to print, means including a cam and follower, for normally opposing said spring, so as to render said actuating means ineffective, a clutch, a power-shaft, and means for effecting a temporary driving connection from said power-shaft to said cam through said clutch so as to effect relative movement between said cam and its follower such as to permit said spring to render said actuating means effective and to subsequently retension and hold said spring.

109. In a typewriting machine, the combination with a printing key and an operating link therefor, of a spring drawing on said operating link, a rotatable snail-cam comprising a raised portion normally holding said link against operation by said spring, a power-shaft, and means to connect said power-shaft to said cam to cause the cam to carry its raised portion clear of said link to permit the spring to operate said key and to retension said spring by further rotation of said cam.

110. In a typewriting machine, the combination with a printing key, of a cam, a spring normally tending to operate said key, but prevented from operation by said cam, a power-shaft, and a one-revolution clutch for connecting said power-shaft to said cam to cause the operation of said key and to restore the mechanism to its initial ineffective position ready to operate said key.

111. In a typewriting machine, the combination with a type-bar and a power-device for operating it, of a rotatable cam normally holding said type-bar against operation, a clutch connected to said cam, a power-shaft for driving said cam by said clutch, and means for connecting said cam by said clutch to said power-shaft, to cause the power-device to operate said type-bar and to again put said type-bar under the control of said power-device.

112. In a typewriting machine, the combination with a traveling carriage and types for printing differentiated characters on a work-sheet, of actuating mechanism for selectively causing said types to print, said actuating mechanism including a series of type-actuator controllers, each individual to a different one of said types and effective when operated to cause said type to print, a series of differentially-settable selectors, each capable of being brought into coöperative relation with any selected one of said controllers to the exclusion of others, and means, including denomination-selecting mechanism controlled by the movement of said carriage, to cause the selected controllers to effect a printing in sequence on said work-sheet of characters determined by the types caused to be actuated by the selected controllers.

113. In a typewriting machine, the combination with a type-bar and an operating link therefor, of a spring drawing on said operating link, a rotatable snail-cam comprising a raised portion normally holding said link against operation by said spring, a power-shaft, and means to connect said power-shaft to said cam to cause the cam to carry its raised portion clear of said link, to permit the spring to operate said type-bar and to retension said spring by further rotation of said cam.

114. In a typewriting machine, the combination with a type-bar, of a cam, a spring normally tending to operate said type-bar, but prevented from operation by said cam, a power-shaft, and a one-revolution clutch for connecting said power-shaft to said cam, to cause the operation of said type-bar and to restore the mechanism to its initial ineffective position ready to operate said type-bar.

115. The combination with keys, of actuating mechanism for said keys, a carriage, carriage-controlled means for governing the action of said actuating mechanism, and selecting means operative to determine the particular actuation of said keys by said actuating mechanism.

116. In a typewriting machine, the combination with an array of type-bars and an array of keys for operating them, of a power-driven shaft, operating devices for said keys adapted to be made effective by said power-shaft, clutches on said shaft for so making them effective, and latches selectively controlling said clutches.

117. In a typewriting machine, the combination with an array of type-bars and an array of keys for operating them, of a power-driven shaft, a separate spring constantly tending to cause each key to operate, a stop normally preventing said operation, means operated by said power-shaft for making said stops ineffective, and a series of latches, one for each means, adapted to be selectively operated to make said springs effective.

118. In a typewriting machine, the combination with an array of type-bars and an array of keys for operating them, of a power-driven shaft, a spring for each key constantly tending to cause it to operate its type-bar, a stop for each key normally preventing said operation, an array of latches, and means controlled by each of said latches for rendering one of said stops ineffective, and for subsequently retensioning the associated spring.

FREDERICK A. HART.

Witnesses:
C. RIPLEY,
LORENZ L. PRITZL.